United States Patent
Gaus

(10) Patent No.: US 9,622,398 B2
(45) Date of Patent: Apr. 18, 2017

(54) ROBOTIC GANTRY BRIDGE FOR FARMING

(71) Applicant: Agbotic, Inc., Potsdam, NY (US)

(72) Inventor: John Paul Gaus, Watertown, NY (US)

(73) Assignee: Agbotic, Inc., Potsdam, NY (US)

( * ) Notice: Subject to any disclaimer, the term of this patent is extended or adjusted under 35 U.S.C. 154(b) by 0 days.

(21) Appl. No.: 14/734,718

(22) Filed: Jun. 9, 2015

(65) Prior Publication Data

US 2015/0351309 A1  Dec. 10, 2015

Related U.S. Application Data

(60) Provisional application No. 62/010,414, filed on Jun. 10, 2014.

(51) Int. Cl.
*A01B 79/00* (2006.01)
*A01G 25/09* (2006.01)
(Continued)

(52) U.S. Cl.
CPC ............ *A01B 51/023* (2013.01); *A01B 35/32* (2013.01); *A01B 76/00* (2013.01); *A01B 79/005* (2013.01); *A01G 25/09* (2013.01)

(58) Field of Classification Search
CPC .... A01G 25/09; A01G 25/097; A01G 25/092; A01G 25/167; A01G 25/00; A01G 25/16; A01B 35/32; A01B 51/023; A01B 76/00; A01B 79/005
USPC ........... 172/1–11; 180/167; 239/1, 724, 731, 239/733, 732, 740, 748, 749, 750, 11, 239/170, 727, 729
See application file for complete search history.

(56) References Cited

U.S. PATENT DOCUMENTS

| 1,702,018 A | 2/1929 | Raulais |
| 4,099,669 A | 7/1978 | Cortopassi |

(Continued)

FOREIGN PATENT DOCUMENTS

| AT | 364659 | 11/1981 |
| EP | 0948887 | 10/1999 |

(Continued)

OTHER PUBLICATIONS

PCT Search Report and Written Opinion mailed Feb. 2, 2016 for PCT Application No. PCT/US2015/034866, 14 pages.

*Primary Examiner* — Robert Pezzuto
(74) *Attorney, Agent, or Firm* — Lee & Hayes, PLLC; Charles L. Warner

(57) ABSTRACT

A robotic gantry (10) for conducting farming operations. The robotic gantry has a bridge (12) which is moved by propulsion mechanisms (14), one or more farming implements (16), a controller (38), and one or more devices (28, 30) to provide position information for the robotic gantry as it moves back and forth along a plurality of crop rows (40). The robotic gantry is connected to a power supply system (20) and, optionally, to a liquid supply system (22), which may be implemented as festoon systems. The controller is automated, self-navigating, and activates, deactivates, and/or changes the operation of the propulsion mechanisms, and deploys, retracts, activates, deactivates, and/or changes the operation of one or more of the farming implements. The height of the frame may be adjusted by height adjustment frames (18) to accommodate crops of different heights and at different times during a growing season.

19 Claims, 6 Drawing Sheets

(51) Int. Cl.
*A01B 51/02* (2006.01)
*A01B 35/32* (2006.01)
*A01B 76/00* (2006.01)

(56) References Cited

U.S. PATENT DOCUMENTS

| | | | | |
|---|---|---|---|---|
| 4,723,714 | A * | 2/1988 | Lucas | A01G 9/247 104/91 |
| 5,246,164 | A * | 9/1993 | McCann | A01B 79/005 239/11 |
| 5,927,603 | A * | 7/1999 | McNabb | A01G 25/092 239/63 |
| 6,431,475 | B1 * | 8/2002 | Williams | A01G 25/09 239/740 |
| 7,140,563 | B2 * | 11/2006 | Sinden | A01G 25/097 239/148 |
| 7,953,550 | B1 * | 5/2011 | Weiting | A01G 25/092 239/727 |
| 9,301,459 | B1 * | 4/2016 | Williams | A01G 25/092 |
| 2010/0032493 | A1 | 2/2010 | Abts et al. | |
| 2013/0253752 | A1 * | 9/2013 | Grabow | G05D 1/0278 701/25 |

FOREIGN PATENT DOCUMENTS

| | | |
|---|---|---|
| FR | 2467528 | 4/1981 |
| FR | 2579065 | 9/1986 |
| FR | 2957220 | 9/2011 |

* cited by examiner

ROBOTIC GANTRY BRIDGE FOR FARMING

CROSS-REFERENCE TO RELATED APPLICATION

This application claims the priority of U.S. Provisional Patent Application No. 62/010,414, filed Jun. 10, 2014, and titled "Robotic Gantry Bridge For Farming", the entire disclosure and contents of which are hereby incorporated herein by reference.

BACKGROUND

In spite of the numerous chemical, genetic, and mechanical improvements made to farming in the past 50 years, farming is still a very labor-intensive activity. To increase the scale and productivity of agriculture, farmers generally have resorted to the use of larger machines, larger plots, increased use of genetically modified seeds, higher use of chemicals, and larger numbers of low-wage workers. These approaches create the need for increased capital to purchase and maintain larger and more complex machines, present environmental issues, and often present labor problems.

SUMMARY

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Rather, this Summary is intended to advise the reader of the general nature of subject matter described herein.

A robotic gantry for farming operations has a plurality of propulsion mechanisms to drive the robotic gantry in a travel path along a plurality of crop rows, a frame connected to the propulsion mechanisms, with the frame having sufficient width to straddle a predetermined number of the crop rows, a plurality of farming implements connected to the gantry, the ability to perform tasks that currently cannot be performed by existing tractors or that are impractical with existing tractors, a power supply system to provide operating power to the propulsion mechanisms, and a controller to control operation of the propulsion mechanisms, and the farming and to manage specific tasks.

DETAILED DESCRIPTION

In the following detailed description, references are made to the accompanying drawings that form a part hereof, in which like numerals represent like elements throughout the several figures, and in which are shown by way of illustration specific embodiments or examples. These specific exemplary embodiments are provided so that this disclosure will be thorough and complete, will fully convey the scope of the invention to those skilled in the art, and should not be construed as limiting. The terminology used in the detailed description of the particular exemplary embodiments illustrated in the accompanying drawings is use for convenience and clarity of explanation and is not intended to be limiting.

Figure 1:
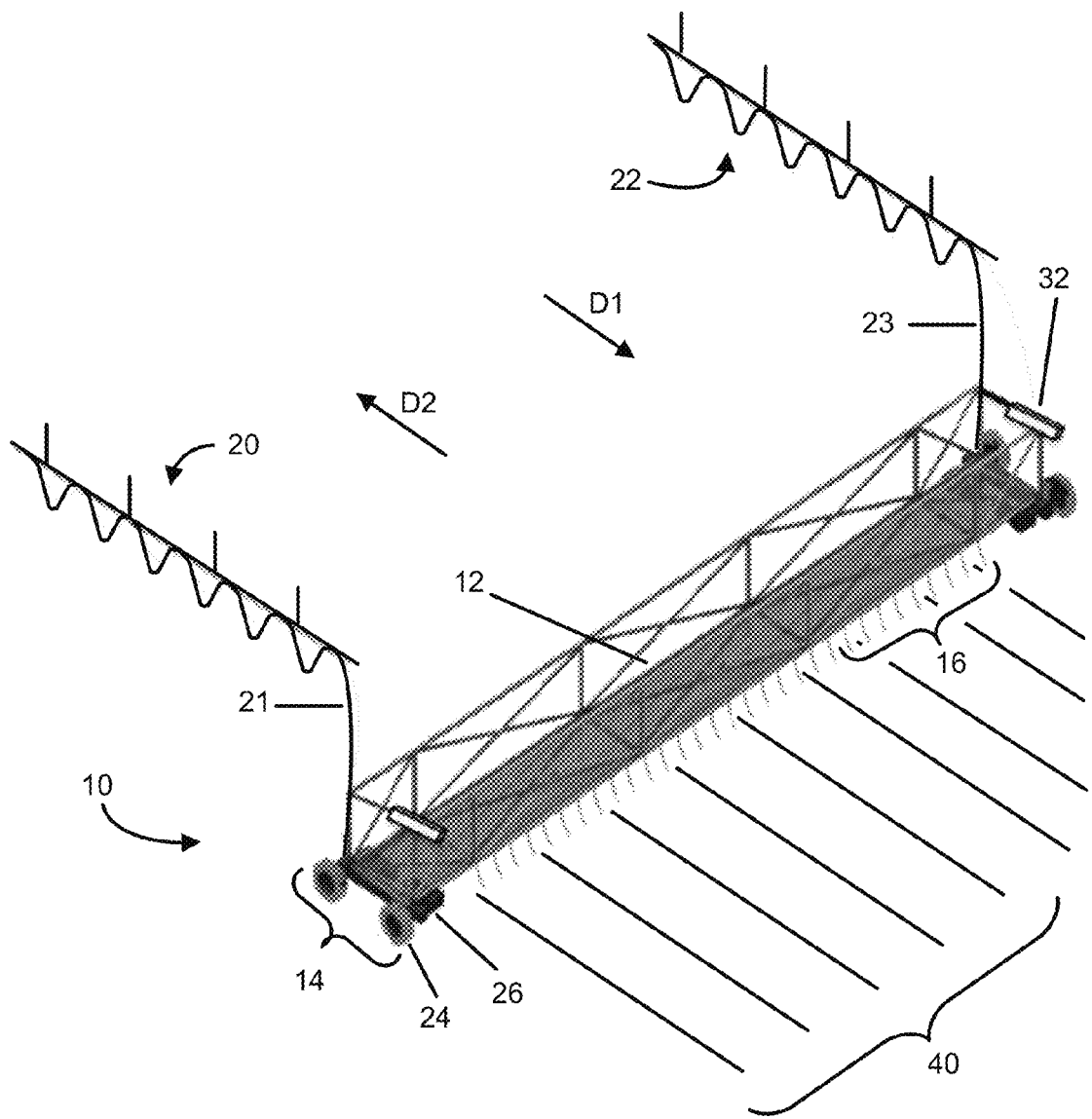
FIG. 1 illustrates an exemplary robotic gantry with wheels.

FIG. 1 illustrates an exemplary robotic gantry 10 with wheels 24. The robotic gantry 10 has a bridge 12 which is moved by propulsion mechanisms 14, has one or more farming implements 16, is connected to a power supply system 20, may be connected to an optional liquid or water supply system 22, and has one or more position detecting systems 30. The robotic gantry 10 spans or straddles a plurality of crop rows 40 and travels along those rows. In the implementation of FIG. 1, the propulsion mechanism 14 comprises one or more wheels 24 driven by motors 26.

In the implementation of FIG. 1, the bridge 12 is in close proximity to the ground. As described further with respect to FIG. 4, the bridge 12 may be raised to a desired height above the ground by one or more height adjustment frames 18, preferably with one height adjustment frame 18 for each propulsion mechanism 14. Thus, the bridge 12 can accommodate a range of crop heights, ranging from lower height crops such as, for example, potatoes and cabbage, to higher height crops such as, for example, tomatoes, and vine crops, such as but not limited to grapes. "Crop" or "crops", as used herein, includes food crops for humans, for food crops for animals, and non-food crops, such as flowers, lawn grass, etc.

The power supply system 20 may provide AC or DC power, as may be convenient, and as may be influenced by factors such as safety, cost, local electrical codes, etc. In one implementation the power supply system 20 is a festoon, as shown. Thus, as the robotic gantry 10 moves in direction D1, the electrical cable 21 extends along the festoon system 20 and, as the robotic gantry 10 moves in direction D2, the electrical cable 21 retracts along the festoon system 20. In another implementation, the power supply system 20 may comprise an electrical track system with two or more rails. In other implementations, the power supply system 20 may comprise rechargeable batteries which power the propulsion mechanisms 14, may be one or more internal combustion engines which directly power the propulsion mechanisms 14, or may be one or more internal combustion engines which charge rechargeable batteries which provide power to the propulsion mechanisms 14. The power supply system 20 may also power other applications on the robotic gantry such as, but not limited to, fans, pollination brushes, band saw harvesters, conveyer belts, tilling devices, control valves for liquids, a height control mechanism, positioning detectors, moisture sensors, pH sensors, cameras, pest abatement devices, and controllers, etc.

In one implementation the water supply system 22 is a festoon, as shown. Thus, as the robotic gantry 10 moves in direction D1, the water supply hose 23 extends along the festoon system 22 and, as the robotic gantry 10 moves in direction D2, the water supply hose 23 retracts along the festoon system 22. The optional liquid supply system 22 may simply provide water which is sprayed or dripped directly on or between crop rows 40, or may provide water which is automatically mixed with a desired additive, such as but not limited to fertilizer, pesticides, weed killer, etc., and then sprayed or dripped directly on or between crop rows 40. In one implementation the liquid supply system 22 is a festoon, as shown. In another implementation, the liquid supply system 22 may be a tank (not shown) which is carried by or on the frame 12. The tank option is less preferred because it adds weight to the robotic gantry 10, which consumes additional power and can compress the ground where the gantry 10 travels. The tank may still be advantageous, however, in some applications, particularly in the case of smaller tanks used for low volume liquids or to facilitate injection of additives to water.

The propulsion mechanism 14 comprises one or more motors, and may also include a shaft, wheel, or other encoder 28 to allow determination of the position of the robotic gantry 10, either alone or in conjunction with a laser ranging system 30. The information from the encoder 28 is preferably reset at the end of each direction of travel so that errors or variations in the output of the encoder do not accumulate.

Figure 2:
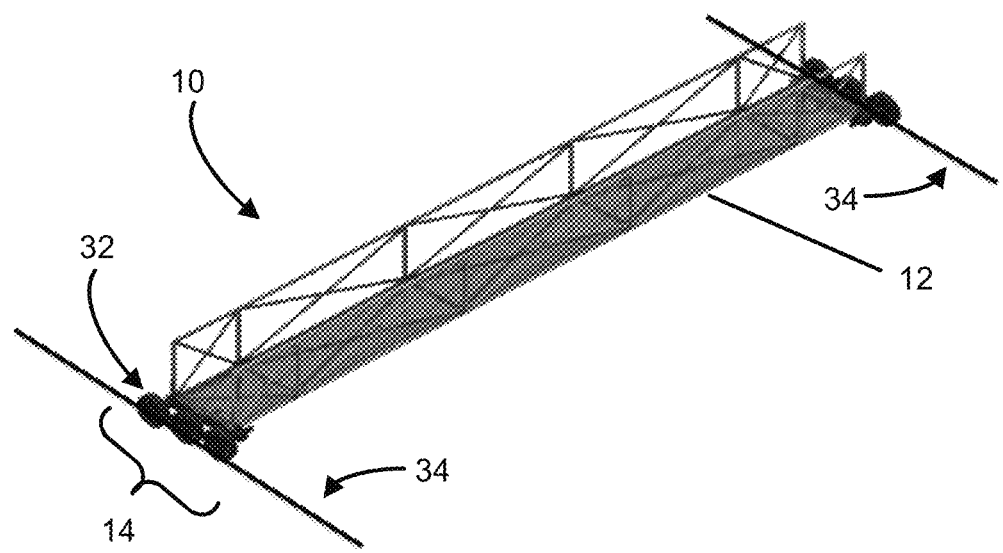
FIG. 2 illustrates an exemplary robotic gantry with flanged wheels.

FIG. 2 illustrates an exemplary robotic gantry 10 with flanged wheels 32 to operate on rails 34 (e.g., operates on rails like a train), or on concrete ledges such as on the edge of greenhouse foundations. This implementation may be particularly useful in situations where there is a greenhouse foundation that may serve as a guide or a track, where it is preferred that wheels, tracks, etc., do not contact and/or compress the ground, or where the ground is ill-suited for wheels or tracks, such as watery areas, boggy areas, very muddy areas, rice fields, etc.

Figure 3:
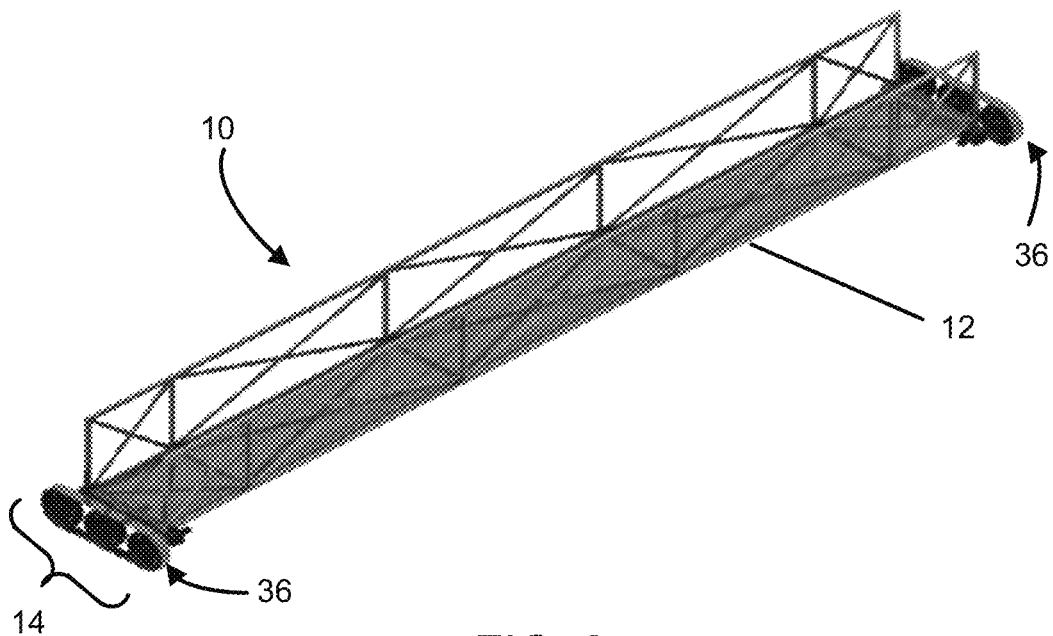
FIG. 3 illustrates an exemplary robotic gantry with tracks.

FIG. 3 illustrates an exemplary robotic gantry 10 with tracks 36 (e.g., like tracks on a bulldozer). This implementation may be particularly useful where it is desired to distribute the weight of the robotic gantry 10 across a larger ground surface area, or when the ground is such that wheels may tend to spin and dig in, such as sandy areas, but still avoid the additional expense of the rail system of FIG. 2.

Figure 4:
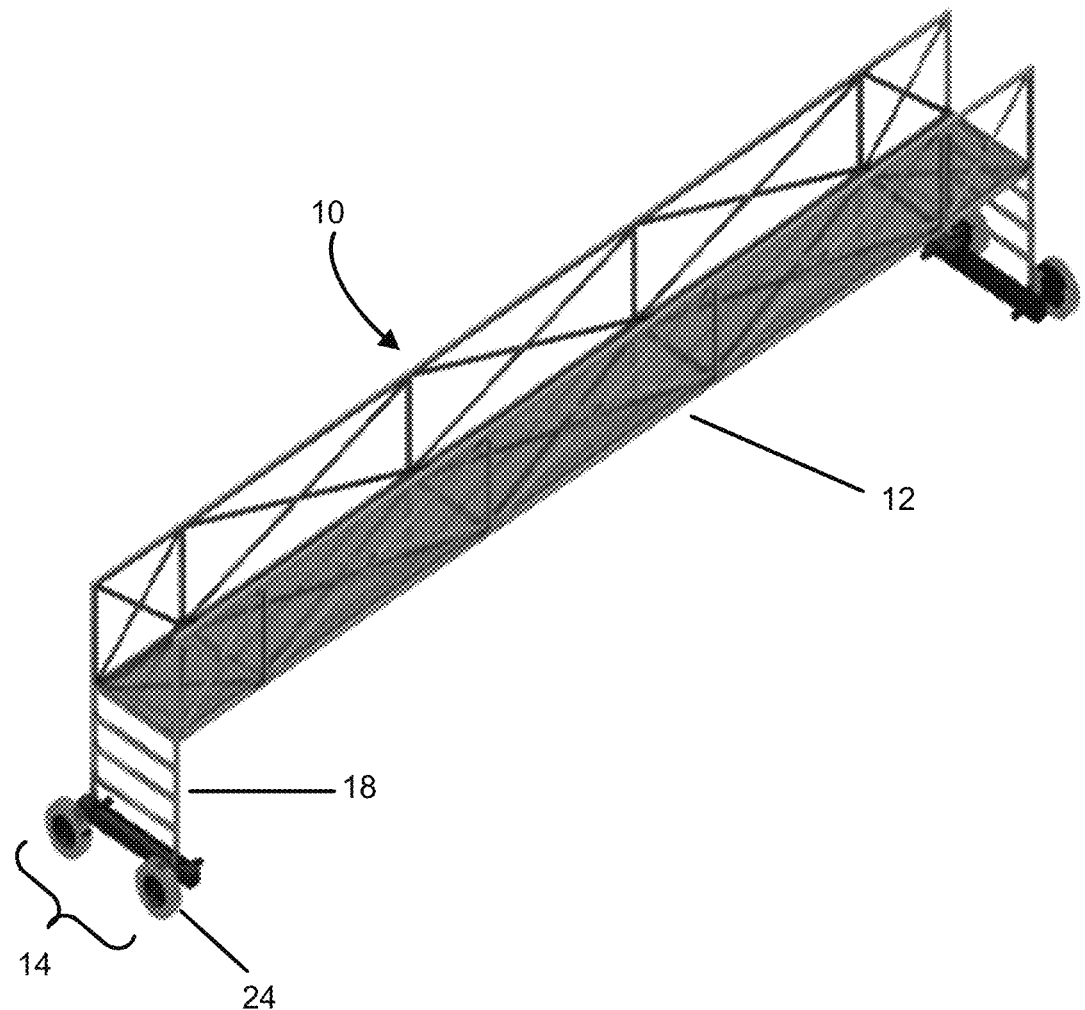
FIG. 4 illustrates an exemplary robotic gantry in a raised position.

FIG. 4 illustrates an exemplary robotic gantry 10 in a raised position with a height adjustment frame 18. The height adjustment frame 18 may be a single piece frame, in which case the height of the bridge 12 may be adjusted by removing a height adjustment frame 18 having one height and replacing it with another height adjustment frame 18 having a different (larger or smaller) height. The height adjustment frame 18 may also comprise stackable sections, in which case the height of the frame 12 may be adjusted by removing or inserting sections.

In one implementation the height adjustment frame 18 is fixed, i.e., that particular robotic gantry 10 is dedicated to a particular crop or class of crops have a similar height. In another implementation the height adjustment frame 18 is adjustable and can accommodate a desired range of crop heights, such as by inserting and removing sections of the frame, or by selecting a desired connection point, such as a mounting hole or support, and affixing the gantry 12 to the frame 18 at that point. In another implementation the height adjustment frame 18 is remotely adjustable to accommodate a desired range of crop heights, such as a motor and gear system (not shown) or a motor and rack and pinion system (not shown) which can raise and lower the gantry 12 to a desired point on the frame 18. The motor may be manually operated or may be controlled by a computer system. Also, in another implementation, the gear system may be manually operated.

Figure 5:
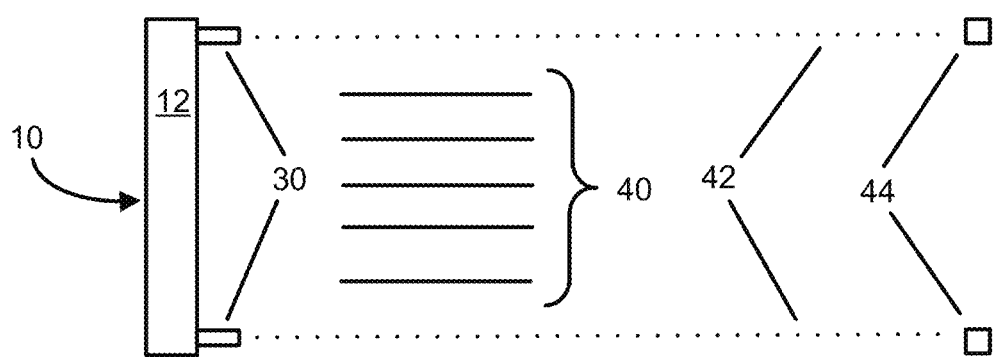
FIG. 5 illustrates a top diagrammatic view of a robotic gantry using a laser measurement device to determine its position.

FIG. 5 illustrates a top diagrammatic view of a robotic gantry 10 optionally using a laser measurement device 30 to determine its position. Preferably, but not necessarily, two laser measurement devices 30 fire laser beams 42 toward known, fixed targets 44. The laser measurement devices 30 provide their respective measurements to a controller 38 which can use those measurements to make adjustments to the motors 26 so that the robotic gantry 10 moves in a straight line, i.e., along the rows 40, and does not twist or go off-path. Information from shaft or wheel encoders may be used in addition to, or instead of, the laser ranging information to determine the position of the robotic gantry 10 and make appropriate adjustments to the propulsion system 14 and to keep positional records of data gathered by sensing device on the robot.

This position information, from the laser ranging device 30 and/or the shaft or wheel encoders 28, may also be used to determine when a particular action is to be implemented. For example, a particular area may need additional water because the ground in that area has more clay or sand than another area, or that section gets more sunlight, etc. Therefore, the robotic gantry 10 may be programmed to provide a first amount of water for a first distance, and then a second amount of water for a second distance, the remainder of the row, etc. That can be done by controlling the forward/reverse speed of the robotic gantry, stopping the gantry at a desired point, backing up the robotic gantry to water that area again, increasing the water flow rate at that point, etc. Conversely, if a particular area needs less water because, for example, that area is at a lower spot and tends to collect and retain more water, then the robotic gantry 10 may be programmed to provide less water, or even no water, in that area, increase the speed while moving through that area, etc.

In contrast to crop dusters and larger irrigation systems, the frame 12 of the robotic gantry 10 operates in rather close proximity to the ground. The farming implements 16, such as sprinklers or pest abatement measures which deliver a desired effect, such as water, fertilizer, insecticide, or insect disturbance, etc., are configured such that the desired effect may be delivered in close proximity to the target areas. This increases effect while minimizing energy, resources, limiting waste, e.g., evaporative waste of the water, minimizes fertilizer and insecticide drift, minimizes pollution and contamination of surrounding areas from excessive application, etc. Also, the farming implements 16 may be arranged on the frame 10 to deliver the desired product directly onto the row or crop, between rows, on every other row, every third row, etc., as appropriate to achieve a desired result. For example, there may two booms for applying liquids: one for watering at soil level, and another for spraying a pesticide mist. Also, a single boom could be used, and moved between high and low positions as needed.

If the motors 26 are electric motors then it may be practical to directly drive the wheels 24, flanged wheels 32, or tracks 36 via shaft or chain. If the motors 26 are electric motors or combustion engines (which are also considered to be motors herein) then it may be necessary to drive the wheels 24, flanged wheels 32, or tracks 36 via a gearbox and/or appropriate sized gear sprockets and wheels to obtain the desired speed and torque. The motors 26 may be controlled by a central controller 38, or may have individual controllers which communicate with each and with the optional remote computer system 50 (FIG. 6).

Figure 6:
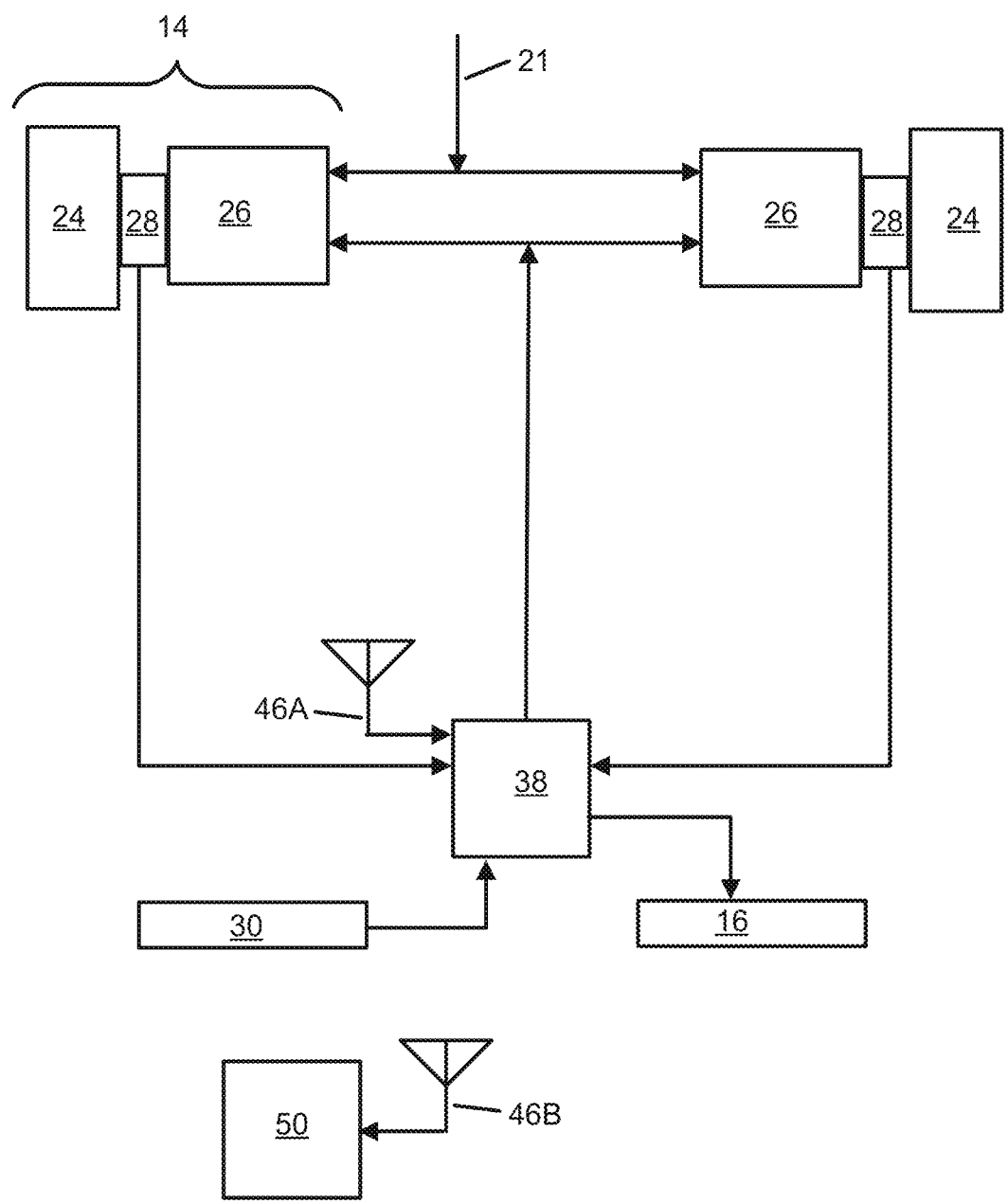
FIG. 6 is a block diagram illustrating the propulsion mechanism, a controller, and an optional remote computer system.

FIG. 6 is a block diagram illustrating the propulsion mechanism 14, a controller 38, and an optional remote computer system 50. As shown, as motor 26 drives a wheel 24 (or a flanged wheel 32 or a track 36). An optional encoder 28 reports the rotation of the wheel 24. The motor 26 receives operating power from the electrical cable 21, and control signals from the controller 38. The controller 38 receives position information from at least one encoder 28 and/or at least one laser ranging system 30. The controller 38 uses this position information to determine and control the desired operation of the motor 26, such as, forward, backward, stop, slow forward, etc., and to determine and control, and vary the speed of the desired operation of the attached farming implement(s) 16, such as, tilling speed, water on, water off, tilling tool up, tilling tool down, fans on or off, pest abatement devices on or off, etc. The controller 38 may be manually programmed on site, but may also receive operating instructions from the optional remote computer system 50 via a communications link, such as indicated by receivers or links 46A and 46B.

The optional remote computer system 50 may actively control the robotic gantry 10 by sensor information and position information and sending instructions in response to that information, or may provide operating parameters to the controller 38, which implements those operating parameters in response to received position information and/or other information, such as soil moisture content, wind speed, the presence of pests or weeds, etc. The controller 38 is preferably powered from the power supply system 20 and may also possess backup power (not shown) to allow the controller 38 to store status information at the time of any power interruption, report the status information and power interruption to, for example, the optional remote computer system 50, and/or to give particular instructions to the motors 26 (e.g., stop) and/or the farming implements 16 (e.g., turn off water, turn off fertilizer, return to standby position, etc.).

The location of the robotic gantry 10 and its movement or navigation back and forth along the rows 40 are therefore monitored and controlled using positional measurement devices 30, encoders 28, or other tracking or position measurement devices, such as, but not limited to, GPS receivers. These devices determine the location, speed, and rotation of the robotic gantry 10 so that it operates at the desired speed for a particular purpose, and navigates so that its wheels or tracks are parallel to each other, as well as to the plant rows 40, as the robotic gantry 10 repeatedly moves from one end of its workspace to the other, up and down the rows 40. The robotic gantry 10 can precisely determination its location, within a fraction of an inch, and gather and provide high-resolution and valuable data regarding the crops and their environment, including information regarding, plant growth rates, soil condition, the types and presence of pests and bugs. Such information may be used by the controller 38 to instruct robotic operations, stored by the controller 38 for later retrieval and/or transmitted to the optional remote computer system 50.

The robotic gantry 10 may be located and operated in a covered space (such as a greenhouse, a hoop house, or other structure), may be located and operated in uncovered space such as farm field, or may be temporarily stored (e.g., overnight) in a sheltered area (e.g., a shed at the end of the rows 40) and then operated in uncovered space.

The robotic gantry 10 can use an array of passive or powered farming implements 16 for planting, pollinating, nurturing, and harvesting crops. Depending upon the implement(s) 16 desired, a particular farming implement may be attached, a procedure conducted, that implement removed, another implement attached, another procedure conducted, that implement removed, etc. Alternatively, two or more farming implements 16 may be attached, with the controller 38 directing the sequential or simultaneous operation of two or more various implements. These farming implements 16 may be fixed to the gantry 12, such as pointing ahead or down, or may move on the bridge 12, such as swiveling from side to side, or moving up and down, such as to plant seeds in the ground. The height of the gantry may be lowered or raised to accommodate different types of plants as well as to adjust to the height of plants throughout a growing season.

Thus, the robotic gantry 10 can use a variety of farming implements to provide a variety of functions such as, but not limited to:

(a) spreading, depositing, dispersing or drilling devices for planting seeds and/or depositing fertilizer;

(b) row shaping and/or precision tilling implements;

(c) drip nozzles, spray nozzles, and/or mist nozzles for watering;

(d) chemical injection systems capable of injecting organic or other chemicals or substances into water or into spray nozzles for applying organic or other chemicals, or substances, directly to plants and/or soil;

(e) air nozzles and vacuum hoses for disrupting bugs and sucking bugs from plants, for example, the air nozzles may provide bursts or puffs of air, which alarm and/or dislodge the bugs from the crops, and the vacuum hoses then suck in the bugs, depending upon the height of the plant, there may be one or more nozzles, arranged vertically, and one or more vacuum hoses, also arranged vertically, there may be an air nozzle(s) and vacuum hose(s) arrangement for each row, for every other row, for every third row, etc. The air nozzle(s) and vacuum hose(s) may also move laterally on the bridge 12 so as to clean one row when the robotic gantry 10 is traveling in one direction, such as D1, and then clean another row when the robotic gantry 10 is traveling in the other direction, such as D2;

(f) acoustic wave (sound) generators for delivering a specific frequency, or a wide range of acoustic frequencies, at one or more power levels, to manage pests, such as insects, birds, rabbits, squirrels, especially, but not necessarily, when used along with air nozzle(s);

(g) vapor generation devices for managing pests and/or bugs by generating and dispensing mists, scents, and/or chemicals which repel or kill bugs, or disrupt mating cycles and/or interrupt the ability of the pest or bug to identify its preferred food source;

(h) ionic air generators to promote plant health and repel pests;

(i) lights capable of generating a specific wavelength or wavelengths of light, including visible light, infrared light, and/or ultraviolet light, or a wide or narrow spectrum of such light, at desired light level(s), to confuse, alarm, or drive away bugs and pests, and/or promote plant health;

(j) electromagnetic frequency generators capable of generating a specific radio frequency or frequencies, or bands of frequencies, at desired power level(s), to disrupt and manage pests and/or promote plant biological responses;

(k) harvesting, packing, and/or storage devices for harvesting specific crops or a general class of crops; and (l) monitoring and data gathering devices and sensors, such as time of flight cameras, laser scanners, color sensors, moisture sensors, wind speed and/or direction sensors, motion sensors, humidity sensors, infrared sensors, to detect anomalies in leaf surfaces, moisture, heat, cold, or heat signatures of bugs pests, biological detection devices, such as pH detectors, motion detectors, chemiluminescence analysis, nano-sensors, etc., for monitoring, measuring or determining environmental data around the crops, such as condition of the soil, air and water around the crops, plant growth rates, pest and/or bug attacks, and biological targets such as mold, fungus, disease, botulism, *salmonella, listeria* or other sources of potential food borne illnesses.

Thus, the described robotic gantry 10 may be tethered to power and water, is self-navigating, can move at adjustable speeds, and is able to carry and use an array of farming implements 16 that reduce the labor required to work the soil, form rows and beds, plant crops, pollinate crops, water crops, manage pest control on crops, cultivate crops, detect disease, and automate the harvest of crops. The robotic gantry 10, along with one or more of its described farming implements 16, thus automates and enhances the planting, nurturing and/or harvesting of crops, enables various automated, chemical and/or non-chemical pest management techniques that are currently not possible or highly difficult using conventional techniques and devices, enhances the precision and/or speed of delivery of seed, water, fertilizer, etc., and reduces the amount of labor required.

Figure 7:
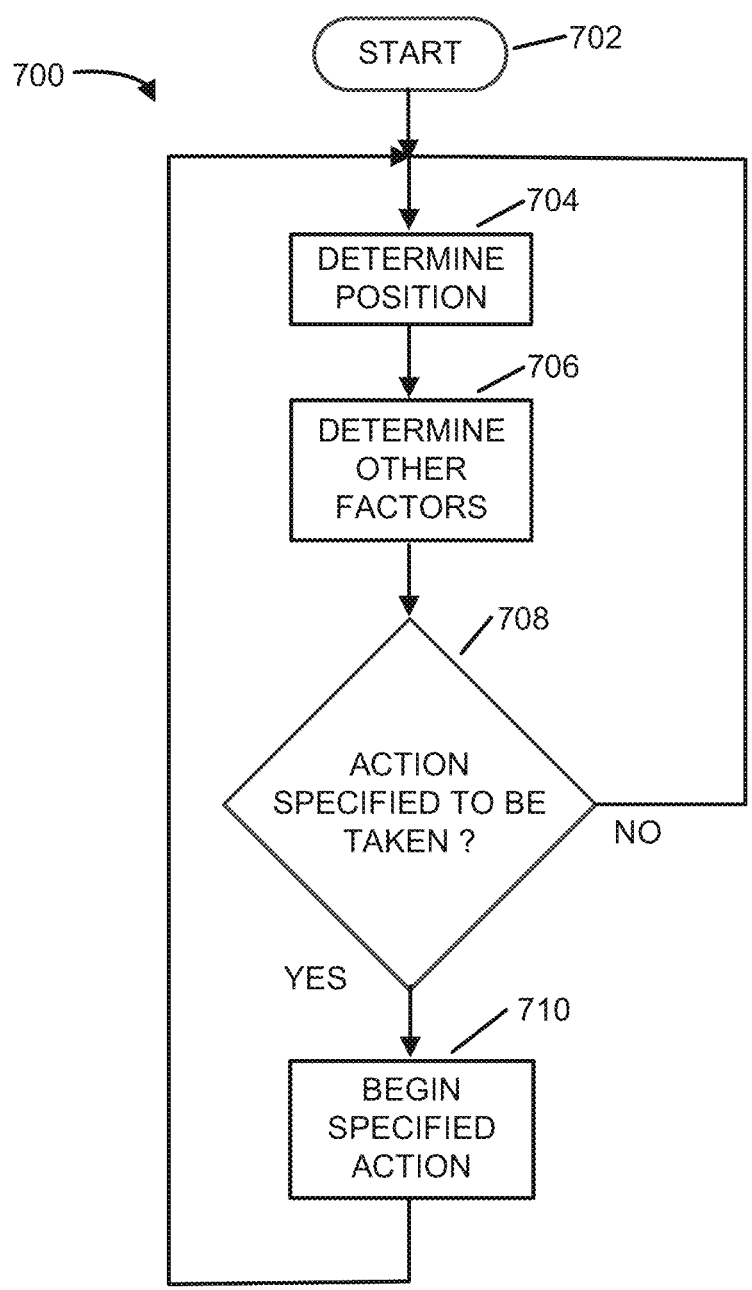
FIG. 7 illustrates an exemplary flow diagram showing an example of the operation of the controller.

FIG. 7 illustrates an exemplary flow diagram 700 showing an example of the operation of the controller 38. Upon starting 702 the controller 38 determines 704 its position and determines 706 other factors, such as, but not limited to, soil moisture content, wind speed, wind direction, humidity, sunlight level, etc. It then determines 708 whether an action is specified or permitted to be taken based upon the position or the other factors. If not then a return is made to step 704 for the next position determination, which may be after some predetermined delay or wait time. If so then a specified action 710 is begun. A return is made to step 704 for the next position determination. It should be understood that the operations of the procedure 700 disclosed herein are not necessarily presented in any particular order and that performance of some or all of the operations in an alternative order(s) is possible and is contemplated. The operations have been presented in the demonstrated order for ease of description and illustration. Operations, also sometimes referred to herein as "actions", may be added, omitted, and/or performed simultaneously, without departing from the scope of the appended claims.

Consider now an exemplary operation of the robotic gantry 10. Upon starting 702 the controller 38 will determine 704 its position. The controller 38 will also determine 706 other factors, such as environmental factors. Assume, for the determined position, that it may be appropriate to begin an operation to, for example, spray an insecticide. Further assume, however, that the current wind speed is 15 mph. The controller 38 would then determine, based upon the wind speed, that the spraying operation should not be conducted. The controller 38 may then return to 704 to being the process again until the wind speed reaches a sufficiently low point, or may begin a different operation instead.

Assume, instead, that a determined position was reached, and the action at that point was to till the soil to prepare the ground for a new crop. The controller 38 would then, at 710, instruct the tiller farming instrument 16 to deploy, and instruct the motors 26 to begin moving the robotic gantry 10 forward (or backwards, as the case may be). The controller 38 could also instruct a seed insertion device to insert a seed into the tilled soil. Thus, two or more operations or actions may be started (or ended) at the same time, or at different times. A return is then made to step 704 where the position and other factors may again be assessed. At some point the robotic gantry 10 will have reached the end of the row so the controller 38 may instruct the motors 26 to stop, to reverse its direction of travel, and to continue to operate or raise the tiller and the seed insertion device. It may then instruct the motors 26 to begin the reverse path, and instruct the farming implements to deploy a watering nozzle to water the ground where the seed has just been placed. On the next return to 704 and 706 the controller 38 may terminate an ongoing action and/or begin a next action. At some point, based on the other factors, which might include date and time, a completion of a designated operation or operations, the controller 38 may stop all operations for the day, return to a starting point, stop in place, wait for a sensor to indicate that an action should be taken, wait for a start or resume signal from the optional remote computer system 50, wait for the human operator to repair or replace a farming implement 16, etc. It will be appreciated that some farming implements may be mounted such that they are considered to be already deployed, or permanently deployed, and so they merely require activation or deactivation. For example, a sprinkler system and tilling implements may be permanently mounted on the underside of the gantry and, to deploy and/or activate these systems merely requires activation of the sprinkler system or movement of the gantry. Other farming implements, however, are actually deployed or retracted, such as, for example, planting and harvesting equipment.

It also should be understood that the illustrated procedure 700 can be ended at any time and need not be performed in its entirety. Some or all operations of the procedure 700, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like.

Figure 8:
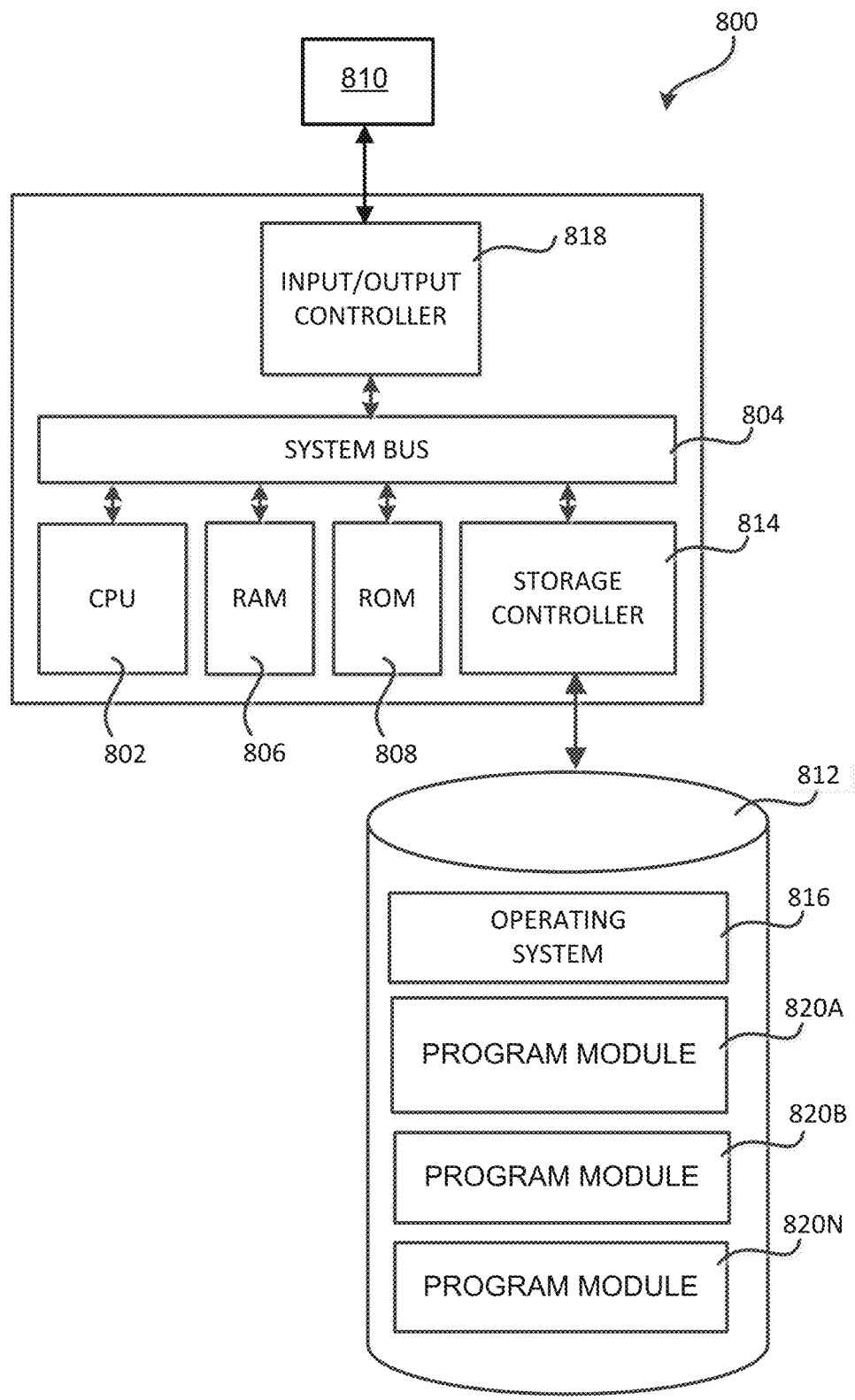
FIG. 8 illustrates exemplary computer architecture for devices capable of performing as described herein.

FIG. 8 illustrates exemplary computer architecture suitable for the controller 38 and for the optional remote computer system 50. The computer architecture 800 may be utilized to execute any aspects of the software operations presented herein. Although a microprocessor-based implementation is preferred because of flexibility and versatility, the robotic gantry 10 may also be controlled using other components such as, for example, relays, limit switches, and timers, especially where the actions to be performed are somewhat basic such, for example, make one pass down the rows 40 and then stop, make a pass and a reverse pass and then stop, make a specified number of passes and reverse passes and then stop, start and stop at predetermined times, etc.

The exemplary computer architecture 800 includes at least one central processing unit 802 ("CPU"), a system memory including a random access memory 806 ("RAM") and a read-only memory ("ROM") 808, and a system bus 804 that couples the memories 806, 808 to the CPU 802. A basic input/output system containing the basic routines that help to transfer information between elements within the computer architecture 800, such as during startup, is stored in the ROM 808. The computer architecture 800 further includes a mass storage device 812 for storing the operating system 816 and one or more programs or modules 820A-820N.

The mass storage device 812 is connected to the CPU 802 through a mass storage controller 814 connected to the bus 804. The mass storage device 812 and its associated computer-readable media provide non-volatile storage for the computer architecture 800. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 800.

Although the memories 806 and 808 and mass storage device 812 are preferably separate components, one or both of the memories 806 and 808 could be included in the mass storage device 812. The memories 806 and 808 and mass storage device 812 may be collectively considered to be, and referred to as, a memory device.

Other components may also be present. For example, a radio frequency (RF) transceiver 810 may be connected to an antenna 46A, 46B to provide for a communications link between a controller 38 and the optional remote computer system 50. In the case of the controller 38, the encoder 28, the laser ranging device 30, or a sensor (moisture level detector, light level detector, microphone, camera, etc.) may be connected via the input/output controller 818. Also, in the case of the controller 38, controlled devices may be connected via the input/output controller 818, the controlled devices include, by way of example and not of limitation, the motors 26, the laser range finder 30, valves to turn the water supply on or off, or at some desired level, motors to raise, lower, swivel, rotate, etc., various farming implements 16 such as tillers, plows, seed insertion devices, shears, etc.

"Communications link" includes any modulated data signal such as a carrier wave or other transport mechanism and includes any delivery media. The term "modulated data signal" means a signal that has one or more of its characteristics changed or set in a manner as to encode information in the signal. By way of example, and not limitation, "communications link" includes wired media such as a wired network or direct-wired connection, and wireless media such as acoustic, RF, infrared, optical, and other wireless media, and combinations of any of the above.

The input/output controller 818 may also be connected to one or more user input devices (not shown) such as, but not limited to, a keyboard, mouse, touchscreen, touchpad, keypad, or electronic stylus. Similarly, the input/output controller 818 may provide output to one or more user display devices (not shown) such as, but not limited to, a display screen, a printer, or other type of output device. A user input device and a user output device may be embodied in the same component, such as a touch-sensitive screen. The user input device and the user output device may be integral with the device, such as in the case of a handheld device, or may be separate components, such as a keyboard, mouse and display used with many desktop systems.

It should be appreciated that the software components described herein, when loaded into the CPU 802 and executed, transform the CPU 802 and the overall computer architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. The CPU 802 may be a single processor, or may be a plurality of processors. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture in order to store and execute the software components presented herein. It also should be appreciated that the computer architecture may include other types of computing devices, including hand-held computers, embedded computer systems, personal digital assistants, and other types of computing devices known to those skilled in the art. It is also contemplated that the computer architecture may not include all of the components shown herein, may include other components that are not explicitly shown herein, or may utilize an architecture completely different than that shown herein.

Computer storage media may include volatile and non-volatile, removable and non-removable media implemented in any method or technology for storage of information such as computer-readable instructions, data structures, program modules or other data. For example, computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 800. For purposes of the claims, the phrases "computer storage medium", "computer storage media", and variations thereof, do not include waves, signals, and/or other transitory and/or intangible communication media, per se, and the broadest reasonable interpretation of these terms does not include waves, signals, and/or other transitory and/or intangible communication media per se, or interpretations which are prohibited by statutory or judicial law.

The different program modules 820A-820N may contain instructions for one or more actions. For example, one module, for example, 820A, may contain instructions as to what speed the robotic gantry 10 is to move, another module, for example, 820B, may contain instructions relating to acceptable wind speeds, humidity, time of day, another module, for example, 820N, may contain instructions relating to the deployment and retraction of certain farming implements 16, etc. The program modules may execute in conjunction with the execution of an operating system and application programs. Those skilled in the art will recognize that other implementations may be performed in combination with other types of program modules. Generally, program modules include routines, programs, components, data structures, and other types of structures that perform particular tasks.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, steps, operations, elements, and/or components, but do not preclude the presence or addition of one or more other features, steps, operations, elements, components, and/or groups thereof.

It will be understood that when an element is referred to as being "connected" or "coupled" to another element, it can be directly connected or coupled, mechanically, hydraulically, electrically, electronically, wirelessly, etc., to the other element, or intervening elements may be present.

As used herein, the term "and/or" includes any and all combinations of one or more of the associated listed items. As used herein, phrases such as "between X and Y" and "between about X and Y" should be interpreted to include X and Y unless otherwise specifically noted. Further, terms such as "about", "approximately", and "substantially" are relative terms and indicate that, although two values may not be identical, their difference is such that the apparatus or method still provides the indicated or desired result, or that the operation of a device or method is not adversely affected to the point where it cannot perform its intended purpose. As an example, and not as a limitation, if a height of approximately "X" inches is recited, a lower or higher height is still "approximately "X" inches if the desired function can still be performed or the desired result can still be achieved.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. For brevity and/or clarity, well-known functions or constructions may not be described in detail herein.

While the terms vertical, horizontal, upper, lower, bottom, top and the like may be used herein, it is to be understood that these terms are used for ease in referencing the drawing and, unless otherwise indicated or required by context, does not denote a required orientation.

The different advantages and benefits provided by the present invention may be used individually or in combination with one, some or possibly even all of the other benefits. Furthermore, not every implementation, nor every component of an implementation, is necessarily required to obtain, or necessarily required to provide, one or more of the advantages and benefits of the implementation.

Conditional language, such as, among others, "can", "could", "might", or "may", unless specifically stated otherwise, or otherwise understood within the context as used, is generally intended to convey that certain embodiments optionally include certain features, elements and/or steps, while some other embodiments optionally do not include those certain features, elements and/or steps. Thus, such conditional language indicates, in general, that those features, elements and/or step are not required for every implementation or embodiment.

From the above, it will be appreciated that the robotic gantry described herein addresses several problems such as, but not limited to, reducing the human labor required to plant, grow, and harvest crops, farming with the use of harmful or potentially harmful chemicals, controlling the environment of the crops, and managing pests and bugs, in a manner and to a degree that was neither possible nor practical before now.

Although the subject matter presented herein has been described in language specific to mechanical, operational, and computer structural features, and specific operations, it is to be understood that the appended claims are not necessarily limited to the specific hardware, features, acts, or media described herein. Furthermore, the claimed subject matter is not limited to implementations that solve any or all disadvantages noted in any part of this disclosure. Rather, the specific mechanical, operational, and computer structural features, and specific operations, are disclosed as example forms of implementing the claims and should not be construed as limiting. Various modifications and changes may therefore be made to the subject matter described herein and still fall within the scope of the claims.

I claim:

1. A robotic gantry comprising:
    a plurality of propulsion mechanisms to drive the robotic gantry in a travel path along a plurality of crop rows;
    a bridge connected to the propulsion mechanisms, the bridge having sufficient width to straddle a predetermined number of the crop rows;
    a plurality of farming implements connected to the bridge;
    a power supply system to provide operating power to the propulsion mechanisms, wherein the power supply system comprises a power rail or a power cable festoon; and
    a controller to control operation of the propulsion mechanisms and operation of the farming implements wherein the controller, in response to detecting a predetermined environmental condition, activates at least one farming implement.

2. The robotic gantry of claim 1 wherein the power supply system comprises a power rail.

3. The robotic gantry of claim 1 and further comprising a water supply system.

4. The robotic gantry of claim 3 wherein the water supply system comprises a water line festoon.

5. The robotic gantry of claim 1 wherein each propulsion mechanism of the plurality of propulsion mechanisms comprises at least two wheels disposed in a linear arrangement and a motor, the motor being connected to and driving at least one of the wheels.

6. The robotic gantry of claim 1 wherein each propulsion mechanism of the plurality of propulsion mechanisms comprises at least two flanged wheels disposed in a linear arrangement and a motor, the motor being connected to and driving at least one of the flanged wheels.

7. The robotic gantry of claim 1 wherein each propulsion mechanism comprises at least a track and a motor, the motor being connected to and driving the track.

8. The robotic gantry of claim 1 and further comprising a plurality of height adjustment frames, each height adjustment frame being connected to the bridge to a corresponding propulsion mechanism.

9. The robotic gantry of claim 8 wherein the plurality of height adjustment frames are selected to provide a desired height of the gantry with respect to a predetermined crop.

10. The robotic gantry of claim 1 wherein the farming implements comprise at least one of tillers, plows, sprayers, misters, seed insertion devices, air nozzles, vacuum hoses, a sound generator, a light, shears, a band saw, harvesting devices, packing devices, storage devices.

11. The robotic gantry of claim 1 and further comprising at least one of a laser range finder or an encoder to provide position data to the controller.

12. The robotic gantry of claim 11 wherein the controller is responsive to the position data to at least one: deploy a farming implement, retract a farming implement, activate a farming implement, activate the propulsion systems, deactivate the propulsion systems, begin an action, or end an action.

13. The robotic gantry of claim 1 and further comprising at least one of a camera, laser scanner, color sensor, moisture sensor, wind speed sensor, wind direction sensor, motion sensor, humidity sensor, or microphone to provide environmental data.

14. The robotic gantry of claim 13 wherein the controller is responsive to the environmental data to at least one of: deploy a farming implement, retract a farming implement, activate an air nozzle, activate a vacuum hose, begin watering, increase a rate of watering, decrease a rate of watering, stop watering, generate a sound, activate a light, or activate a vapor generation device.

15. The robotic gantry of claim 1 wherein the controller comprises a processor connected to a memory and an input/output controller, the memory containing operating instructions for the processor.

16. The robotic gantry of claim 1 wherein the controller activates a farming implement while causing the propulsion mechanisms to drive the robotic gantry in a first travel path along the crop rows, and deactivates the farming implement while causing the propulsion mechanisms to drive the robotic gantry in a second, reverse travel path along the crop rows.

17. The robotic gantry of claim 1 wherein the controller causes the propulsion mechanisms to drive the robotic gantry in a first travel path along the crop rows and then to active a predetermined farming implement once a predetermined position along the crop rows has been reached.

18. A method for operating a robotic gantry for farming, the method comprising:
    in response to detecting a predetermined environmental condition, causing the robotic gantry to begin moving along a plurality of crop rows, and activating at least one farming implement;
    causing the robotic gantry to begin moving along a plurality of crop rows, activating at least one farming implement, and, in response to detecting that the robotic gantry is at a predetermined position along the crop rows, causing the robotic gantry to change a rate of movement along a plurality of crop rows; or
    causing the robotic gantry to begin moving along a plurality of crop rows, activating at least one farming implement, and, in response to detecting of a predetermined environmental condition, causing a change in an activation level of the farming implement.

19. A computing device to control the operation of a robotic gantry for farming, the computing device comprising:
    a memory device containing instructions for an operating system and at least a one program module;
    an input/output device;
    a processor coupled to the memory device and to the input/output device, the processor executing the instructions to at least one of:
        in response to detection of a predetermined environmental condition, cause the robotic gantry to begin moving along a plurality of crop rows, and activate at least one farming implement;
        cause the robotic gantry to begin moving along a plurality of crop rows, activate at least one farming implement, and, in response to detection that the robotic gantry is at a predetermined position along the crop rows, cause the robotic gantry to change a rate of movement along a plurality of crop rows; or
        cause the robotic gantry to begin moving along a plurality of crop rows, activate at least one farming implement, and, in response to detection of a predetermined environmental condition, cause a change in an activation level of the farming implement.

* * * * *